United States Patent [19]
Hershkowitz et al.

[11] 4,099,142
[45] Jul. 4, 1978

[54] CONDENSED EXPLOSIVE GAS DYNAMIC LASER

[75] Inventors: Joseph Hershkowitz, West Caldwell; Mary Y. DeWolf Lanzerotti, Morristown, both of N.J.

[73] Assignee: The United States of America as represented by the Secretary of the Army, Washington, D.C.

[21] Appl. No.: 728,661

[22] Filed: Oct. 1, 1976

Related U.S. Application Data

[63] Continuation-in-part of Ser. No. 549,579, Feb. 13, 1975, abandoned.

[51] Int. Cl.² ............................................. H01S 3/095
[52] U.S. Cl. ............................................. 331/94.5 G
[58] Field of Search ................ 331/94.5 P, 94.5 G; 330/4.3

[56] References Cited

U.S. PATENT DOCUMENTS

| 3,646,471 | 2/1972 | DeMent | 331/94.5 |
|---|---|---|---|
| 3,876,960 | 4/1975 | De Koker et al. | 331/94.5 |
| 3,904,985 | 9/1975 | Robinson et al. | 331/94.5 G |
| 3,940,298 | 2/1976 | Beckert et al. | 331/94.5 G |
| 4,016,500 | 4/1977 | Pilloff | 331/94.5 P |

*Primary Examiner*—William L. Sikes
*Assistant Examiner*—Marcus S. Rasco
*Attorney, Agent, or Firm*—Nathan Edelberg; Harold H. Card, Jr.; A. Victor Erkkila

[57] ABSTRACT

The condensed explosive of a gas dynamic laser is a condensed mixture of one or more nonhydrogenous organic explosive compounds, such as TNM, with a sufficient amount of aluminum or zirconium powder to supply energy to the products so that a temperature of at least 1100° K. can be achieved at a nozzle throat at a pressure of not more than 10 atmospheres, in such proportions that $\tau_{II} > \tau_E > \tau_I$, which produces a population inversion. Satisfactory examples include TNM alone or combined with HNB in various proportions, mixed with 7.5 to 17.5% of aluminum powder.

14 Claims, 11 Drawing Figures

CONDENSED EXPLOSIVE GAS DYNAMIC LASER

GOVERNMENT INTEREST

The invention described herein may be manufactured, used, and licensed by or for the Government for Governmental purposes without the payment to us of any royalties thereon.

BACKGROUND OF THE INVENTION

The present invention relates to an improved gas dynamic laser incorporating a condensed explosive for producing a population inversion, for generating a high intensity pulse of coherent radiation. A military application of such a laser results from the ability to concentrate large quantities of energy practically instantaneously onto a small region at a considerable distance from the source. A laser includes a lasing medium, which may be either solid, liquid or gas, in which electron or molecular energy is stored in a particular way to produce a population inversion. This means that a high or upper energy (or excited) state or level of the medium is densely populated (i.e. many of the molecules are in the high energy state) whereas a normally well-populated lower energy state or level is relatively empty. If a population inversion exists, the energy difference between the high and low energy states can be released almost instantaneously as a coherent beam or pulse of radiation with a defined wavelength and phase. A beam or pulse can in principle be maintained for a significant duration by continually replenishing the upper energy level and depleting the lower energy level. The storage of energy in the lasing medium is sometimes called "pumping".

A gas dynamic laser is one in which the lasing medium is a gas, or a mixture of gases, such as carbon dioxide ($CO_2$) and nitrogen ($N_2$). Such gas lasers usually include a source of the gas for the lasing medium and a separate means for pumping the medium to produce the necessary population inversion. In Reuter, et al., U.S. Pat. No. 3,262,071, the gaseous lasing medium is pumped by radiation generated by the explosion of a carbon rod. DeMent U.S. Pat. No. 3,414,868 discloses a laser in which a solid, liquid or gas lasing medium is pumped by light generated by an exploding wire or chemical explosive such as TNT, PETN, TNM, RDX, etc., or by burning metal particles such as aluminum. Gregg U.S. Pat. No. 3,623,145 discloses a laser in which the lasing medium is an explosive gaseous mixture of hydrogen and a nitrogen-fluorine compound, such as $N_2F_2$, which is ignited by flash photolysis or an electron beam, and the resulting chemical explosion pumps a lasing chemical species, hydrogen, deuterium or tritium fluoride, which is formed in the chemical explosion.

An abstract by C. P. Robinson and J. A. Sullivan, of Los Alamos Scientific Laboratory, in the Bulletin of the American Physical Society, Februrary, 1972, p. 67, briefly described some results obtained with a gas laser in which the laser gases were chemically produced in the explosion of a condensed explosive, HNB (hexanitrosobenzene-$C_6N_6O_6$), and the gases were thermally pumped at high stagnation temperatures (3 to 5 $\times$ 10$^{3°}$ K.) over a wide range of pressures. A gain of 3% per cm. was reported in the abstract. The condensed explosive gas laser of Robinson and Sullivan is the subject matter of Robinson et al. U.S. Pat. No. 3,904,985, issued Sept. 9, 1975. In a private communication, we have been informed that Robinson and Sullivan also experimented with PETN (pentaerythritol tetranitrate-$C_5H_8N_4O_{12}$), which did not form a good lasing mixture (which they attributed to the excess of water vapor, about 4.5%, present) and also considered the use of pentanitroaniline ($C_6H_2N_6O_{10}$), alone, and mixtures of TNM (tetranitromethane-$CN_4O_8$) plus acrylonitrile ($C_3NH_3$) and TNM plus HNB, as the condensed explosive.

Calculations made by us showed that when HNB alone (one explosive used by Robinson and Sullivan) is exploded and the explosion products are allowed to expand, both the pressure and the temperature in the products decrease along the expansion path as shown in Table I:

Table I

| Pressure (Atmospheres) | Temperature (° K) |
|---|---|
| 1093 | 1412 |
| 497 | 1298 |
| 226 | 1204 |
| 103 | 1123 |
| 47 | 1051 |
| 21 | 985 |

A corresponding table for PETN (the other explosive tried by Robinson and Sullivan) is shown in Table II:

Table II

| Pressure (Atmospheres) | Temperature (° K) |
|---|---|
| 5817 | 1277 |
| 2620 | 1121 |
| 1180 | 991 |
| 532 | 877 |

It can be seen from these tables that with either HNB or PETN, alone, it is necessary to operate (provide lasing) in a very high pressure region (at least 60 atmospheres in the case of HNB) in order to have a temperature of at least 1100° K. This is true of all other organic explosives, such as TNM. Another disadvantage of using any of HNB, TNM or PETN, alone, as the condensed explosive in a laser is that, at reasonably low pressures and reasonably high temperatures, the calculated values of the relaxation time $\tau_{II}$ of the upper lasing level, the characteristic expansion time $\tau_E$ of the lasing medium, and the relaxation time $\tau_I$ of the lower lasing level do not satisfy the relationship $$\tau_{II} > \tau_E > \tau_I$$

required to produce a population inversion in the expansion region beyond the nozzle throat. Instead, $\tau_{II}$ is always less than, instead of greater than, $\tau_E$.

In accordance with the present invention, the disadvantages pointed out above are avoided by using, as the condensed explosive of a gas dynamic laser, a condensed mixture of one or more nonhydrogenous organic explosive compounds, such as TNM, with a sufficient amount of aluminum or zirconium metal powder to supply energy to the products so that a temperature of at least 1100° K. can be achieved at the nozzle throat at a pressure of not more than 10 atmospheres, and simultaneously adjusting the proportions (percentages) of the mixture to produce conditions satisfying the above inequality. The aluminum powder adds various aluminum compounds, including aluminum oxide ($Al_2O_3$), to the explosion products. The beam attenuation produced in the lasing medium by the solid $Al_2O_3$ is insufficient to prevent lasing, because of the relatively small quantity present and the extremely small size and optical surface properties of the particles.

Other compounds that may be used instead of TNM include dinitrobfurazanyl ($C_4N_6O_6$) and trinitro, triazido-benzene ($C_6N_{12}O_6$). The choice is based on compatibility, appropriateness for casting or pressing, sensitivity, storability, degradation and other properties related to qualificatons as a practical explosive. For this application, the additional required feature is the correct elemental composition of the total mixture for adequate energy release and classification as a detonating explosive.

Each of the explosive compounds named above except PETN is nonhydrogenous. Calculations have shown that water vapor in some explosion products (as with PETN) tends to inhibit or quench the formation of the population inversion essential to lasing.

As an example of an apparatus for carrying out the method of the present invention, the confining chamber of the laser may be a double-walled metal structure made up of two concentric elongated metal members with part of the space therebetween filled with a resilient cushioning material, and the explosive mixture may be in the form of a solid element disposed centrally within the inner member near one end. A convergent-divergent nozzle plate within the inner member, comprising at least one throat spaced from the explosive element, defines the input end of an expansion region. The generated laser output beam, or pulse, may be transmitted through optical windows on the double wall of the chamber structure, opposite the expansion region.

DETAILED DESCRIPTION OF A PREFERRED EMBODIMENT

Figure 1:
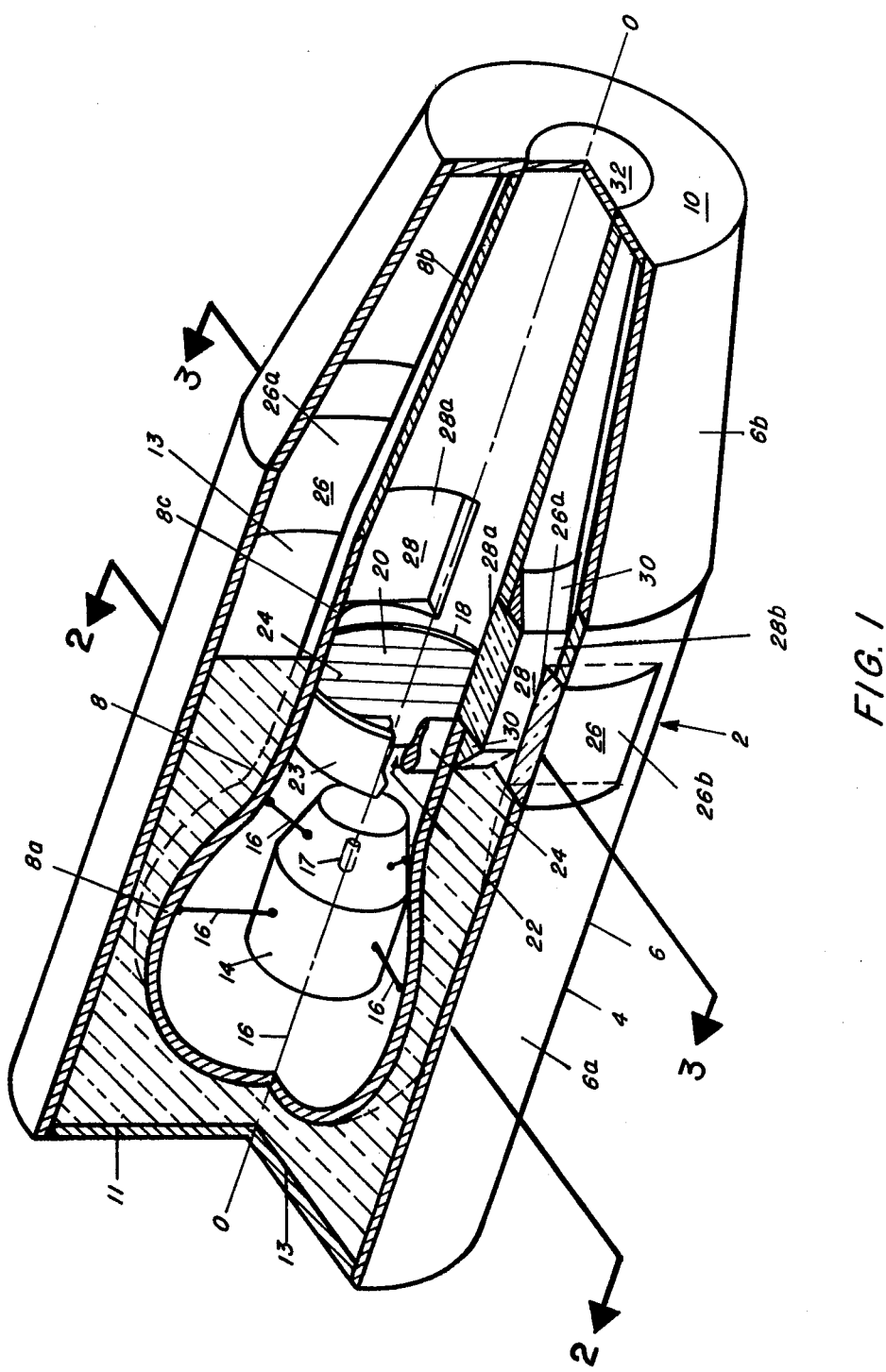
FIG. 1 is a perspective side view, partly in axial section, of an apparatus for carrying out the method of the present invention.

The apparatus 2, illustrated as an example in FIG. 1, comprises a double-walled metal structure 4 including a strong outer wall 6, e.g. of steel, an inner wall 8, e.g. of copper, and front and rear metal end walls 10 and 11, respectively. The outer and inner walls preferably have concentric surfaces of revolution, as shown, with the outer wall made up of a rear cylindrical section 6a and a forward tapered or frusto-conical section 6b, and the inner wall made up of a rear bulbous or spherical section 8a, a forward convergent tapered section 8b coextensive with section 6b, and an intermediate cylindrical section 8c. The inner wall 8 may be connected at its front end to the front wall 10. The space between the inner and outer sections 8a and 6a is filled with resiliend cushioning material 13, such as fiberglass honeycomb, hollow glass beads, or foamed plastic, which also positions and supports the rear end of inner wall 8.

Figure 2:
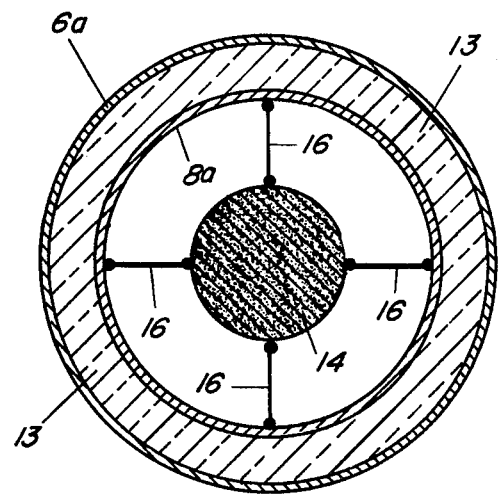
FIGS. 2 and 3 are transverse section views taken in the planes 2—2 and 3—3 of FIG. 1.

A solid explosive element 14, consisting of the condensed explosive mixture of the present invention, is centrally mounted within the spherical section 8a of the inner wall, by suitable means, e.g. a plurality of fine tension wires 16, as shown in FIGS. 1 and 2. This solid element 14 also preferably has a surface of revolution concentric with the section 8a, for symmetry. The explosive element 14 may be detonated by means including an electric squib element 17 mounted thereon or within, and an external voltage source (not shown). In FIG. 1, the element 17 is shown (dotted) on axis about one-fourth of the explosive length from the forward end.

A nozzle plate 18, having at least one convergent-divergent nozzle 20 having a throat (narrowest region) 22, is mounted across the inner wall 8, in the section 8c, at a distance from the solid element 14 determined by the particular explosive material, its shape and size, the shape of the inner wall, and the pressure and temperature desired at the throat 22. For example, the height of the throat 23 may be 0.06 cm, which is used in the calculation of the characteristic expansion time $\tau_E$. As shown, the nozzle plate 18 may include a ring 23 containing a plurality of parallel vanes 24 forming vertically elongated nozzles 20 with throats 22 therebetween.

Figure 3:
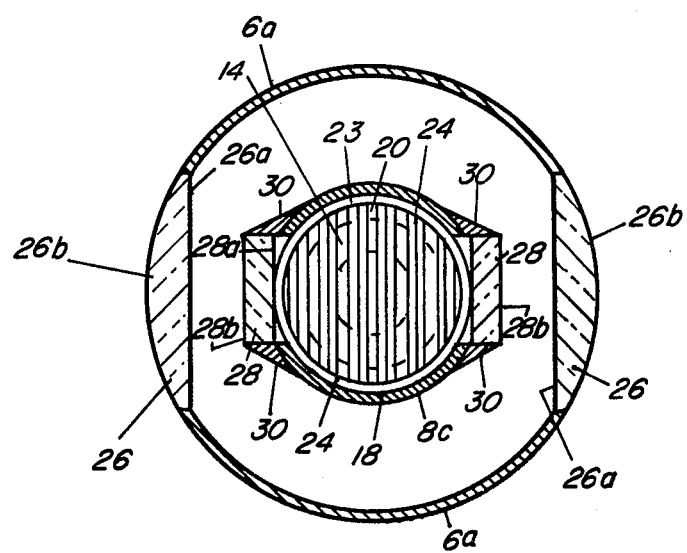

When the explosive element 14 is detonated, the explosion products, which are largely gases including $CO_2$, CO, $N_2$ and $O_2$, and also include a small quantity of condensed matter (e.g. $Al_2O_3$ and free carbon), are reflected by the spherical section 8a in the general direction of the axis O—O, through the nozzle plate 18 and a relatively low pressure expansion region, within section 8c, beyond the nozzles 20. The explosion products interact with the inner wall 8, principally in the region of section 8a, causing the latter to be deformed and displaced toward the outer wall section 6a and compressing the cushioning medium 13. Under certain conditions, a population inversion is formed in the predominantly gaseous explosion products within the expansion region beyond nozzles 20. As a result, a laser beam or pulse may be generated in a resonant cavity located in the expansion region and formed between two aligned optical windows 28, in the wall 8, spaced apart an integral number of half wavelengths at the resonant frequency of the lasing medium. The apparatus shown in the drawing includes two aligned pairs of windows 26 and 28 rigidly mounted at 30 in the walls 6 and 8, on opposite sides of the central axis O—O. As shown best in FIG. 3, each of the inner windows 28 has substantially-flat opposite faces 28a and 28b that are parallel to each other and to the faces 28a and 28b of the other window 28; and each of the outer windows 26 has an inner face 26a which is parallel to the faces of the windows 28 and the face 26a of the other window 26, and an outer cylindrical face 26b which is flush with the outer surface of cylindrical section 6a to permit fitting the structure 4 into a cylindrical support. The inner surfaces 28a are coated with partially reflecting coatings to produce multiple reflections as well as permit transmission of the laser radiation therethrough. The laser radiation can be utilized in only one direction from the apparatus by using a 100% reflecting coating on one of the surfaces 28a. In this case, the window 26 on the same side is no longer necessary. Alternatively, the lasing medium in the expansion region may be used to amplify a beam of radiation of the same frequency transmitted therethrough. The forward end of the tapered section 8b is temporarily closed prior to the detonation of the explosive 14 by a thin rupture disc 32.

In accordance with the present invention, the solid explosive element 14 comprises a condensed explosive mixture, containing at least carbon, nitrogen and oxygen, and either aluminum or zirconium powder, and capable of producing a lasing medium of explosion products including at least $CO_2$ and $N_2$ gases, and sometimes CO, at a pressure not greater than 10 atmospheres and a temperature of at least 1100° K., under conditions satisfying the above inequality, $\tau_{II} > \tau_E > \tau_I$, at the nozzle throat. When this inequality is satisfied, a population inversion is automatically established in the explosion products in the expansion region beyond the nozzle throat 22, thus coverting these explosion products to a lasing medium.

Most explosives are composed of carbon, nitrogen and oxygen, with or without hydrogen, and produce as principal explosion product species, $CO_2$, $N_2$ and CO. Some explosives also produce other products including $H_2$, $H_2O$, $O_2$, NO and free carbon. The ratio in which these species appear depends primarily on the atomic composition of the explosive and secondarily on the pressure and temperature of the products. Several known methods exist which permit the nature and relative abundance of the various species produced by a C, H, N, O explosive to be predicted without resort to expensive testing. The calculation of these product species is well known in the art. It is based on simulating by computation the transformations which the solid explosive undergoes to arrive at explosion products at the pressure of interest and to provide the corresponding temperature, i.e. the detonation wave properties are first calculated and the expansion of the detonation products along the isentrope to a far lower pressure is then calculated.

A more detailed description of the correspondence of the physical transformation processes of the explosive to the computations follows.

The product species are produced physically by the following sequence. The explosive is transformed by a propagating detonation wave which provides detonation products at a very high pressure and temperature and at a volume smaller than that of the original solid explosive. These detonation products have an equation of state expressing one variable in terms of two others, i.e. they are described by a surface. For example, the equation of state may be in the form P (pressure) as a function of V (volume) and T (temperature) or instead of P as a function of V and S (entropy). The variables used to express the equation can be changed through the use of standard thermodynamic relations. The detonation wave process provides a particle velocity, a detonation pressure, and a detonation volume for the detonation products. Thus, the detonation corresponds to one unique point on the equation of state surface. The detonation product gases now expand isentropically, i.e. so rapidly that the entropy does not change (no heat transfer can occur in the very short time that the explosion occurs). Hence, if one now thinks of the equation of state as P as a function of V and S, since S is a constant (at the detonation point value) P is a function of V only. This locus (curve) corresponds to the intersection of the plane S = constant with the equation of state surface. If we had used T as the independent variable instead of V, then we could just as well say that the gases expand isentropically along a P, T locus. The point is that the physical process that occurs only permits particular combination of P and T, those on the locus described. A method of calculating the value of P for a given explosive and a given T is set forth in FORTRAN BKW: A Code for Computing the Detonation Properties of Explosives, by C. L. Mader, Los Alamos Scientific Laboratory, Los Alamos, New Mexico, available from Clearinghouse for Federal Scientific and Technical Information, National Bureau of Standards, U.s. Department of Commerce, Springfield, Virginia 22151, incorporated herein by reference.

This invention involves selecting explosives which will provide a point on the locus having pressure and temperature in particular ranges and at the same time having the equilibrium composition required for the desired lasing action. For any P and T specified, the composition parameters for the equilbrium composition are also calculated as described by Mader. Hence, since the P and T of interest are known from required values for lasing action as described herein, there remains only the need to establish whether indeed the desired P and T are arrived at physically. This is done by calculation by Mader using the equation of state combined with the Rankin Hugoniot conservation laws of mass, momentum and energy and the Chapman-Jouguet correlaton to arrive at the unique detonation point described earlier. The entropy for this point is then calculated and inserted into the equation of state to determine the isentrope locus. Into this locus, the pressures of interest are inserted to determine the corresponding temperatures. If the latter are also in the range of interest, then the properties of the composition are examined for suitability as to lasing action, as described below. The entire calculation described is completely feasible to be done by hand using a simplified equation of state, but is normally done in a few minutes of computation time on a computer. The programs to do this are set forth by Mader.

Since water is not desired in the products, one must select an explosive that does not contain hydrogen. Too much carbon in the products optically quenches the lasing action, and hence, is minimized. The ratio R of the moles of ($N_2$ + CO) to the moles of $CO_2$ in the product is an important parameter to be considered, and should be at least equal to unity for efficient action. However, the primary requirements are the low pressure, relatively high temperature, and the inequality given above.

Product species calculations were made of PETN, HNB and TNM explosive compounds, providing results for the transformation of the solid explosive to equilibrium products initially at about 200,000 atmospheres, in the range 1000° to 5000° K., and a density of about four-thirds that of the initial solid. These results describe the isentropic expansion of the products to lower pressures and temperatures that follows the initial detonation.

In these calculations, it was assumed that the rate of change of temperature and pressure is sufficiently slow for chemical equilibrium to be established for each pair of values. Such calculations are good first approximations to the chemical compositions in the rapid expansive flow of newly formed products and in the flow entering the convergent-divergent nozzle. The rate of change of chemical composition with temperature and pressure is slow for the range involved. The effect of reshocking at the wall section 8a on the chemical composition may also be calculated for higher order approximations, but final choice of the optimum proportion of explosive constituents would be done experimentally instead.

For comparison with the present invention, some of the isentropic composition parameters predicted for the compounds PETN, TNM and HNB, and a mixture thereof, alone (i.e, without aluminum or zirconium), at temperatures from 1121° to 1181° K. at the nozzle throat 22, are shown as Examples A, C, G and I in the following Table III, wherein M/K means moles per kilogram of explosive in the lasing medium at the nozzle throat:

TABLE III

| Ex | PETN % | TNM % | HNB % | Al % | T °K | P Atmos | N₂ M/K | NO M/K | CO M/K | CO₂ M/K | R | H₂O M/K | H₂O % | O₂ M/K | O₂ % | H₂ M/K | Total Gas M/K | C(s) M/K | Al₂O₃ M/K | Solid Gas % |
|---|---|---|---|---|---|---|---|---|---|---|---|---|---|---|---|---|---|---|---|---|
| A | 100 | 0 | 0 | 0 | 1121 | 2620 | 6.307 | 0 | .952 | 12.992 | 0.56 | 11.022 | 34 | 0 | 0 | .64 | 32.419 | 1.41 | 0 | 4.3 |
| B | 80 | 0 | 0 | 20 | 1102 | 9.787 | 5.058 | 0 | 8.467 | 3.879 | 3.5 | 3.023 | 11 | 0 | 0 | 6.48 | 27.216 | 0 | 3.706 | 13.6 |
| C | 0 | 100 | 0 | 0 | 1171 | 109.331 | 10.202 | 0 | 0 | 5.101 | 2.0 | 0 | 0 | 15.303 | 50 | 0 | 30.606 | 0 | 0 | 0 |
| D | 0 | 87.5 | 0 | 12.5 | 1120 | 19.862 | 8.926 | .0026 | 0 | 4.464 | 2.0 | 0 | 0 | 9.915 | 43 | 0 | 23.307 | 0 | 2.316 | 10.0 |
| E | 0 | 85 | 0 | 15 | 1164 | 4.301 | 8.670 | .0035 | 0 | 4.336 | 2.0 | 0 | 0 | 8.837 | 40 | 0 | 21.847 | 0 | 2.780 | 12.7 |
| F | 0 | 82.5 | 0 | 17.5 | 1140 | .565 | 8.414 | .005 | 0 | 4.209 | 2.0 | 0 | 0 | 7.758 | 38 | 0 | 20.386 | 0 | 3.243 | 15.9 |
| F' | 0 | 82.5 | 0 | 17.5 | 1357 | 2.000 | 8.411 | .0123 | 0 | 4.209 | 2.0 | 0 | 0 | 7.755 | 38 | 0 | 20.386 | 0 | 3.243 | 15.9 |
| G | 0 | 0 | 100 | 0 | 1123 | 102.781 | 11.900 | 0 | 5.971 | 8.914 | 9.8 | 0 | 0 | 0 | 0 | 0 | 26.785 | 8.914 | 0 | 33.3 |
| H | 0 | 0 | 90 | 10 | 1144 | 9.656 | 10.710 | 0 | 11.336 | 2.262 | 0.76 | 0 | 0 | 1.701 | 6 | 0 | 24.308 | 7.822 | 1.853 | 39.8 |
| I | 0 | 0 | 50 | 5 | 1181 | 100.891 | 11.050 | .002 | 0 | 14.451 | 0.76 | 0 | 0 | .227 | .9 | 0 | 27.203 | 0 | .927 | 0 |
| J | 0 | 50 | 47.5 | 7.5 | 1140 | 5.431 | 10.498 | .0006 | 1.021 | 13.728 | 0.91 | 0 | 0 | 0 | 0 | 0 | 24.453 | 0 | 1.390 | 3.8 |
| K | 0 | 47.5 | 46.25 | 10 | 1140 | 2.418 | 10.222 | 0 | 2.496 | 12.346 | 1.2 | 0 | 0 | 0 | 0 | 0 | 23.589 | 0 | 1.853 | 5.9 |
| L | 0 | 46.25 | 45 | 12.5 | 1140 | 1.353 | 9.946 | 0 | 3.971 | 10.509 | 1.6 | 0 | 0 | 0 | 0 | 0 | 22.951 | 0 | 2.316 | 8.1 |
| M | 0 | 45 | 43.75 | 10 | 1140 | .714 | 9.670 | 0 | 3.228 | 8.673 | 1.7 | 0 | 0 | 0 | 0 | 0 | 22.314 | 0 | 1.853 | 10.4 |
| N | 0 | 43.75 | 49.5 | 12.5 | 1140 | 3.228 | 10.022 | 0 | 4.944 | 8.903 | 1.7 | 0 | 0 | 0 | 0 | 0 | 23.869 | 0 | 2.316 | 7.8 |
| O | 0 | 40.5 | 53.75 | 10 | 1130 | 4.418 | 9.840 | 0 | 9.412 | 5.102 | 3.8 | 0 | 0 | 0 | 0 | 0 | 24.354 | 0 | 2.316 | 9.5 |
| P | 0 | 25.5 | 59.5 | 15 | 1132 | 4.407 | 9.682 | 0 | 12.959 | 1.635 | 13.9 | 0 | 0 | 0 | 0 | 0 | 24.276 | .868 | 2.780 | 15.0 |

In Table III, the M/K of total gas does not always agree with the sum of the M/K of the gaseous product species $N_2$, NO, $CO_2$, CO, $H_2$, $H_2O$, and $O_2$ listed, because of the presence of small amounts of $CH_4$ and/or $NH_3$, which are ignored, and the effects of rounding off the individual composition parameters.

The predicted relaxation times $\tau_{II}$ and $\tau_I$ of the upper and lower lasing levels, respectively, and the characteristic expansion time $\tau_E$ of the explosion products for Examples A, C, G and I are shown in Table IV:

Table IV

| Ex | PETN % | TNM % | HNB % | Al % | T °K | $\tau_{II} \times 10^{-6}$ | $\tau_E \times 10^{-6}$ | $\tau_I \times 10^{-6}$ | Usable |
|---|---|---|---|---|---|---|---|---|---|
| A | 100 | 0 | 0 | 0 | 1121 | .0003 | 1.047 | .00005 | NO |
| B | 80 | 0 | 0 | 20 | 1102 | .0788 | 1.061 | .0187 | NO |
| C | 0 | 100 | 0 | 0 | 1171 | .00005 | .973 | .00002 | NO |
| D | 0 | 87.5 | 0 | 12.5 | 1120 | .317 | 1.124 | .111 | NO |
| E | 0 | 85 | 0 | 15 | 1164 | 1.385 | 1.132 | .480 | YES |
| F | 0 | 82.5 | 0 | 17.5 | 1140 | 10.476 | 1.158 | 3.646 | NO |
| F' | 0 | 82.5 | 0 | 17.5 | 1357 | 1.670 | 1.079 | .667 | YES |
| G | 0 | 0 | 100 | 0 | 1123 | .056 | .946 | .016 | NO |
| H | 0 | 0 | 90 | 10 | 1144 | 2.382 | .996 | .280 | NO |
| I | 0 | 50 | 50 | 0 | 1181 | .025 | 1.051 | .0119 | NO |
| J | 0 | 47.5 | 47.5 | 5 | 1140 | .520 | 1.119 | .218 | NO |
| K | 0 | 46.25 | 46.25 | 7.5 | 1140 | 1.290 | 1.131 | .514 | YES |
| L | 0 | 45 | 45 | 10 | 1140 | 2.732 | 1.138 | 1.000 | YES |
| M | 0 | 43.75 | 43.75 | 12.5 | 1140 | 6.349 | 1.144 | 2.092 | NO |
| N | 0 | 40.5 | 49.5 | 10 | 1140 | 1.477 | 1.113 | .474 | YES |
| O | 0 | 33.75 | 53.75 | 12.5 | 1130 | 2.153 | 1.095 | .464 | YES |
| P | 0 | 25.5 | 59.5 | 15 | 1132 | 7.474 | 1.070 | .665 | YES |

A method of determining $\tau_I$, $\tau_{II}$ and $\tau_E$ for each example in Table III, is set forth herein in the Appendix below.

Inspection of Table III shows that the three explosive compounds PETN, TNM and HNB (A, C and G) and one explosive mixture (I) are not suitable for use in a laser because of the high pressures involved, for the temperature considered. Moreover, Table IV shows that in each example, the upper level relaxation time $\tau_{II}$ is less than the characteristic expansion time $\tau_E$, and hence, the relationship $\tau_{II} > \tau_E > \tau_I$ is not satisfied and the population inversion cannot be produced. Also, in the cases of PETN alone (A) and mixture I, the ratio R is considerably less than 1, which would reduce the efficiency. In the case of HNB alone (G), the ratio of carbon to gas is about 33%, which would render the medium too opaque.

In the present invention, aluminum or zirconium powder is mixed in suitable proportions with a suitable substantially nonhydrogenous organic explosive compound, or a suitable mixture of such compounds, to reduce the pressure without reducing the temperature below 1100° k., and to increase the relaxation time $\tau_{II}$. The metal powder favors the production of CO at the expense of the $CO_2$, since it competes for the oxygen in the mixture. The isentropic composition parameters predicted for twelve other examples (B, D, E, F, H, and J through P) of organic explosive compounds, or mixtures, mixed with aluminum powder, at temperatures above 1100° K., are shown, with Examples A, C, G and I, in Table III, and the predicted relaxation times $\tau_{II}$ and $\tau_I$ and characteristic expansion time $\tau_E$ of the explosive products for these twelve examples are shown in Table IV. The percentages of the various explosive compounds and of aluminum in each example are by weight.

Examples B, D through F, H and J through P in Tables III and IV show the effects of incorporating various percentages of aluminum powder into the explosive compounds of PETN, TNM and HNB, and mixtures thereof.

In Example B, with 20% Al, $\tau_{II}$ is less than $\tau_E$, and hence, this example is inoperative. Moreover, adding sufficient aluminum to make $\tau_{II} > \tau_E$ would greatly increase the ratio of solids to gas, which would make the lasing medium far too opaque.

Examples D, E and F show that 12.5% Al is not sufficient to make $\tau_{II} > \tau_E$; that Example E is operative; and that 17.5% Al in Example F is too high, for the temperature and pressure chosen, since it makes $\tau_I > \tau_E$. However, Example F', with the same explosive mixture as Example F, is operative at a higher temperature of 1357° K. and a lower pressure of 2 atmospheres. The ratio (about 16%) of solids to gas in Example F' is considered acceptable.

Example H is considered unsatisfactory for use in the present invention, even though $\tau_{II} > \tau_E > \tau_I$, because of the high ratio of solids to gas (about 40%). Obviously, other percentages of aluminum would also be unsatisfactory, for the same reason.

Examples J through M use explosive compounds with equal amounts (percentages) of TNM and HNB, like Example I, with various amounts of aluminum powder added. Examples J shows that 5% Al is insufficient to make $\tau_{II} > \tau_E$, and hence, is inoperative. Examples K and L are satisfactory, since $\tau_{II} > \tau_E > \tau_I$, and are superior to Examples F and F' because of the lower solids to gas ratios.

Examples N, O and P consist of three progressively lower ratios, 45–55%, 38.57–61.43%, and 30–70%, respectively, of TNM to HNB, with increasing amounts of aluminum, as compared to the 50–50% mixtures in Examples I through M. All three of examples satisfy the basic requirement, $\tau_{II} > \tau_E > \tau_I$, and are otherwise satisfactory for use in the present invention.

Comparisons between Examples A and B, C and F, G and H, and I and M show that the effects of mixing metal powder, such as aluminum, with the organic explosive compound are to reduce the pressure, $N_2$, $CO_2$ and total gas molecules, in each case, and to increase the CO and the ratio of (CO + $N_2$) to $CO_2$, in most cases. One result of these effects is to increase $\tau_{II}$ by two or more order of magnitude, without changing $\tau_E$ greatly. Another result is to increase $\tau_I$ by several orders of magnitude.

Comparisons between Examples L and N, and M and O, show that, for a given percentage of aluminum and a given temperature, decreasing the ratio of TNM to HNB increases the pressure, $N_2$, CO, ratio of CO + $N_2$ to $CO_2$, and total gas, but decreases the CO, solids to gas ratio, $\tau_{II}$ and $\tau_I$.

In addition to HNB, other nonhydrogenous organic explosive compounds that can be used with TNM and either aluminum or zirconium powder to practice the present invention are dinitrobifurazanyl ($C_4N_6O_6$) and trinitro, triazidobenzene ($C_6N_{12}O_6$).

The double-walled structure 4 is preferably designed as a cartridge, with external walls dimensioned to fit within the breech chamber of a relatively large weapon, such as a 175 mm. artillery gun, modified by the addition of a suitable optical port or window associated with the windows 26 and 28. In this way, the gun can be re-used by inserting a succession of cartridges to produce a succession of laser pulses.

The space between the condensed explosive 14 and the inner wall 8 may be evacuated or filled with a gas. A vacuum would eliminate the shock that would otherwise be created by the piston action of the expanding explosive products. A specific gas could be used to alter the composition of the products, or to filter the light emission from the products.

APPENDIX

Determination of $\tau$ Values

For each Example in Table III, after the values of the composition parameters, T and P have been determined, by any method, these values are used in the determination of the corresponding values of $\tau_I$, $\tau_{II}$ and $\tau_E$ listed in Table IV, in the following manner.

The number density $D_o$ of the gas molecules in an ideal gas at one atomsphere and temperature T, in °K, is $$D_o = 273/T \times L \text{ molecules/cm}^3,$$

where L is Loschmidt's Number, $2.68719 \times 10^{19}$ particles/cm$^3$. Thus, the number density D at the pressure P is $$D = 273/T\, LP \text{ molecules/cm}^3.$$

For Example E, $$D = 273/1164 \times 2.68719 \times 10^{19} \times 4.3005$$

$$= 2.7104 \times 10^{19}.$$

The mole fraction $X_i$ of each gas component i relative to the total number $n_G$ of gas moles/Kg is $$X_i = n_{i/nG},$$

where $n_i$ is the number of moles of gas component i per Kg of explosive. $n_i$ is related to Mader's $X_i$ (moles of species or component i/mole of explosive) as follows, $$n_i = \frac{1000}{\text{molecular weight of explosive}} \cdot X_i.$$

In Example E, $$X_{CO_2} = 4.336/21.8465 = 0.1985$$

$$X_{N_2} = 8.670/21.8465 = 0.3969$$

$$X_{O_2} = 8.837/21.8465 = 0.4045$$

$$X_{NO} = .0035/21.8465 = 0.00016$$

The mole fraction $Y_i$ of each component i (including solids) relative to the total number $n_T$ of moles/Kg is $$Y_i = n_{i/nT}$$

In Example E, $$n_T = n_G + n_{Al_2O_3} = 21.8465 + 2.780 = 24.6265$$

$$Y_{CO_2} = 4.336/24.6265 = 0.1761$$

$$Y_{N_2} = 8.670/24.6265 = 0.3521$$

$$Y_{O_2} = 8.837/24.6265 = 0.3588$$

$$Y_{NO} = .0035/24.6265 = 0.00014$$

$$Y_{Al_2O_3} = 2.78/24.6265 = 0.1129.$$

The determination of $\tau_I$ and $\tau_{II}$ is based on: reactions a, b and c and equations (12), (13) and (14) of "Time-Dependent Analysis of Population Inversions in an Expanding Gas", John D. Anderson, The Physics of Fluids, Vol. 13, Number 8, August, 1970, pp. 1983–89; and reactions 1, 2 and 13 and equation (30) of "Survey of Vibrational Relaxation Data for Processes Important in the $CO_2$-$N_2$ Laser System", Raymond L. Taylor and Steven Bitterman, Review of Modern Physics, Vol. 41, Number 1, January, 1969, pages 26–47.

Reactions a, b and c of Anderson correspond, respectively, to reactions 13, 2 and 1 of Taylor and Bitterman, set forth on page 7 essentially as follows:

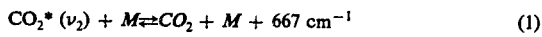

$$CO_2^* (\nu_2) + M \rightleftarrows CO_2 + M + 667 \text{ cm}^{-1} \qquad (1)$$

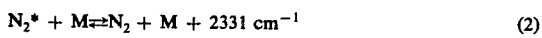

$$N_2^* + M \rightleftarrows N_2 + M + 2331 \text{ cm}^{-1} \qquad (2)$$

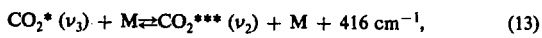

$$CO_2^* (\nu_3) + M \rightleftarrows CO_2^{***} (\nu_2) + M + 416 \text{ cm}^{-1}, \qquad (13)$$

where the asterisks indicate quanta of vibrational excitation in the given mode and M is any collision partner in the gas — $CO_2$, $N_2$, $O_2$, etc., and illustrated by dashed lines in FIG. 1 of their paper, and $\nu_2$ and $\nu_3$ are vibrational modes of $CO_2$.

Anderson's reactions a, b and c are illustrated by solid lines in his FIG. 2, page 1985. On page 1986, Anderson sets forth an equation for determining $\tau_a$, the relaxation time for reaction a, in a gas mixture as follows:

$$\frac{1}{\tau_a} = \frac{X_{CO_2}}{(\tau_a)_{CO_2\text{-}CO_2}} + \frac{X_{N_2}}{(\tau_a)_{CO_2\text{-}N_2}} + \frac{X_{O_2}}{(\tau_a)_{CO_2\text{-}O_2}} \qquad (12)$$

Example E includes $O_2$ and NO, but lacks $H_2O$. Therefore, euqation (12) becomes:

$$\frac{1}{\tau_a} = \frac{X_{CO_2}}{(\tau_a)_{CO_2\text{-}CO_2}} + \frac{X_{N_2}}{(\tau_a)_{CO_2\text{-}N_2}} + \frac{X_{O_2}}{(\tau_a)_{CO_2\text{-}O_2}} + \frac{X_{NO}}{(\tau_a)_{CO_2\text{-}NO}}. \qquad (12a)$$

The mole fraction $X_{NO}$ of NO is so small that the effect of NO on the $\tau$ values can be neglected.

Taylor and Bitterman, page 29, define the kinetic rate constant K, in cm$^3$/particle/second, for an A molecule in a gas of B molecules at one atmosphere and temperature T, as follows:

$$K[Ai(1\rightarrow 0), B] = (\tau_{AB} N_B)^{-1}, \qquad (30)$$

where A and B are gas collision partners, $\tau AB$ is the relaxation time of a molecule of A in a bath of B molecules, and $N_B$ is the number density of B molecules at 1 atmosphere pressure and temperature T, which is the same as $D_o$ above. Equation (30) may be written, $$1/\tau_{AB} = NB\ K[Ai(1\rightarrow 0), B]. \quad (30a)$$

At pressure P, $$(1/\tau_{AB})_P = D\ K\ [Ai(1\rightarrow 0), B], \quad (30b)$$

where $$D = N_B P = 273/T\ LP.$$

Figure 4:
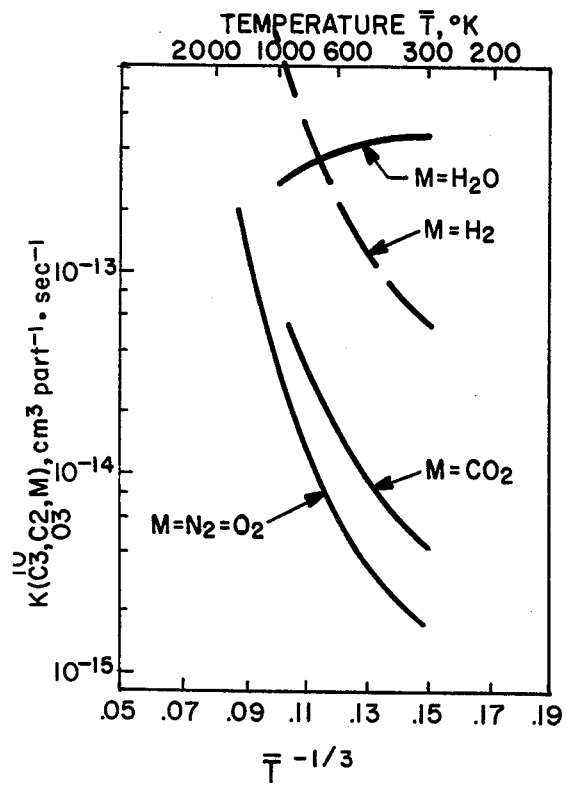
FIGS. 4 through 11 are graphs that are used in the determination of the suitbility of a particular explosive mixture for use in the present invention.

Equation (12a) for reaction a (or 13) may be combined with equation (30b), as follows:

$$1/\tau_a = 1/\tau_{13} = X_{CO_2} D\ K_{13, CO_2} + X_{N_2} D\ K_{13, N_2} + X_{O_2} D\ K_{13, O_2}, \quad (12b)$$

neglecting the NO term. The values of $k_{13,\ CO_2}$, $k_{13,\ N_2}$ and $K_{13,\ O_2}$, at one atmosphere, are obtained from the labeled curves in FIG. 4, which are substantial duplicates of the corresponding curves in FIG. 14 of Taylor and Bitterman.

For Example E, at T = 1164° K and P = 4.3005 atmospheres, $T^{-1/3} = 0.095$, and $$K_{13,\ CO_2} = 1.2 \times 10^{-13}$$

$$K_{13,\ N_2} = 7 \times 10^{-14}$$

$$K_{13,\ O_2} = 7 \times 10^{-14}.$$

Substituting in equation (12b) gives $$1/\tau_a = 0.1985 \times 2.7104 \times 10^{19} \times 1.2 \times 10^{-13}$$
$$+ 0.3969 \times 2.7104 \times 10^{19} \times 7 \times 10^{-14} + 0.4045$$
$$\times 2.7104 \times 10^{19} \times 7 \times 10^{-14} = (0.6456 \times 0.7530$$
$$+ 0.7674) \times 10^6 = 2.166 \times 10^6$$

Therefore, $$\tau_a = 0.4617 \times 10^{-6}\ \text{second}.$$

An equation similar to equation (12b) is written for reaction b of Anderson (reaction 2 of Taylor and Bitterman), as follows:

$$1/\tau_b = 1/\tau_2 = X_{CO_2} D\ K_{2,\ CO_2} + X_{N_2} D\ K_{2,\ N_2} + X_{O_2} D\ K_{2,\ O_2}. \quad (12c)$$

Figure 5:
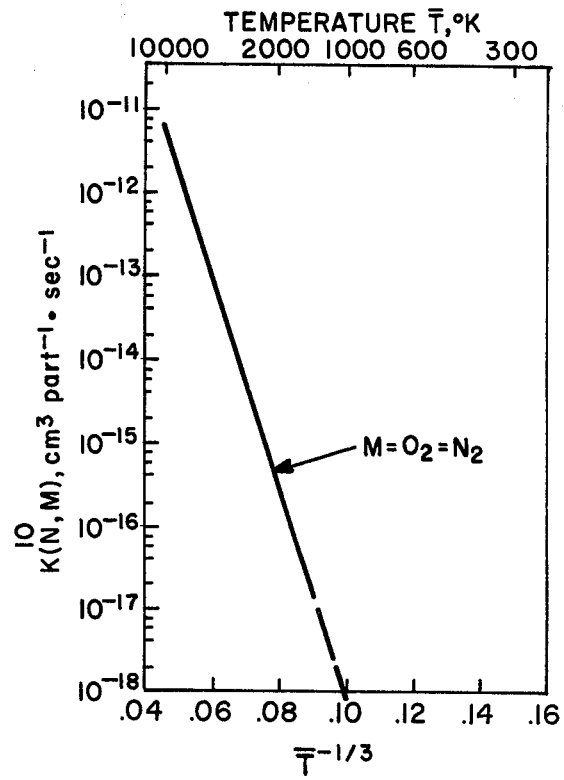
Figure 6:
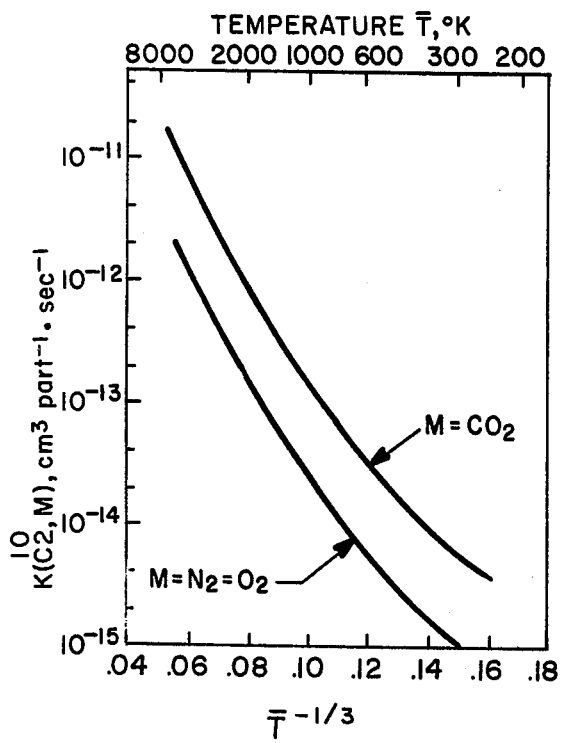

The values of $K_{2,\ N_2}$ and $K_{2,\ O_2}$, which are substantially equal, are obtained from the labeled curves in FIG. 5, which is a substantial duplicate of FIG. 6 of Taylor and Bitterman. For Example E, $K_{2,\ N_2} = N_{2,\ O_2} = 2.5 \times 10^{-18}$. $K_{2,\ CO_2}$ is assumed to be approximately equal to $K_{2,\ N_2}$. Substituting in equation (12c) gives:

$$1/\tau_b = 0.1985 \times 2.7104 \times 10^{19} \times 2.5 \times 10^{-18}$$
$$+ 0.33969 \times 2.7104 \times 10^{19} \times 2.5 \times 10^{-18}$$
$$+ 0.4045 \times 2.7104 \times 10^{19} \times 2.5 \times 10^{-18} = (1.345$$
$$+ 2.689 + 2.741) \times 10^1 = 67.75.$$

Therefore, $$\tau_b = 0.01476\ \text{second}.$$

Another equation similar to equation (12b) for reaction c of Anderson (reaction (1) of Taylor and Bitterman) may be written as follows:

$$1/\tau_c = 1/\tau_1 = X_{CO_2} D K_{1,\ CO_2} + X_{N_2} D K_{1,\ N_2} D K_{1,\ O_2}. \quad (12d)$$

The values of $K_{1,\ CO_2}$, $K_{1,\ N_2}$ and $K_{1,\ O_2}$, for the temperature T involved, are obtained from the labeled curves in FIG. 6, which is a substantial duplicate of FIG. 2 of Taylor and Bitterman. For Example E, $$K_{1,\ CO_2} = 2.1 \times 10^{-13}$$

$$K_{1,\ N_2} = 4.4 \times 10^{-14}$$

$$K_{1,\ O_2} = 4.4 \times 10^{-14}.$$

Substituting in equation (12d) gives:

$$1/\tau = 0.1985 \times 2.7104 \times 10^{19} \times 2.1 \times 10^{-13} +$$
$$0.3969 \times 2.7104 \times 10^{19} \times 4.4 \times 10^{-14} + 0.4045$$
$$\times 2.7104 \times 10^{19} \times 4.4 \times 10^{-14} = (1.130 + 0.4733$$
$$+ .4824) \times 10^6 = 2.0857 \times 10^6.$$

Therefore, $$\tau_c = 0.4795 \times 10^{-6}\ \text{second}.$$

As indicated by Anderson equation (13), the relaxation time $\tau_I$ of the lower lasing level is equal to $\tau_c$.

The relaxation time $\tau_{II}$ of the upper lasing level is determined by using Anderson equation (14):

$$\frac{1}{\tau_{II}} = \left[\frac{X_{CO_2}}{\tau_a} + \frac{X_{N_2}}{\tau_b}\right] \frac{1}{(X_{CO_2} + X_{N_2})}. \quad (14)$$

For Example E, this becomes:

$$\frac{1}{\tau_{II}} = \frac{.1985 \times 2.166 \times 10^6 + .3969 \times 67.75}{.1985 + .3969}$$

$$= .722 \times 10^6.$$

Therefrom, $$\tau_{II} = 1.3848 \times 10^{-6}\ \text{second}.$$

It will be noted that $1/\tau_b$ is so small compared to $1/\tau_a$ in equation (14) that the term $X_{N_2}/\tau_b$ could have been neglected.

The characteristic expansion time $\tau_E$ is $$\tau_E = \frac{\text{Throat height}}{\text{Speed of sound at the throat}}. \quad (15)$$

The throat height of the nozzle 20 is given as 0.06 cm. The speed of sound of an ideal gas is $$C = \sqrt{\frac{\gamma RT}{M}}, \quad (16)$$

where $\gamma$ is the polytropic gas law exponent, R is the Gas Constant $8.3143 \times 10^7$ ergs/deg./mole, T is the temperature, $$M = \sum_{i=1}^{m} Y_i m_i$$

$m_i$ is the molecular weight of component i, and $m$ is the number of gas, liquid and solid components.

The exponent $\gamma$ is the ratio of the total heat capacity $C_P$ of the components at constant pressure to the total heat capacity $C_v$ of the components at constant volume, both in calories/deg./mole, expressed as follows:

$$\gamma = \frac{C_p}{C_v} = \frac{\sum_{i=1}^{m} Y_i C_{pi}}{\sum_{i=1}^{m} Y_i C_{vi}} \quad (17)$$

$$= \frac{Y_{CO_2}C_{pCO_2} + Y_{N_2}C_{pN_2} + Y_{NO}C_{pNO} + Y_{O_2}C_{pO_2} + Y_{Al_2O_3}C_{pAl_2O_3}}{Y_{CO_2}C_{vCO_2} + Y_{N_2}C_{vN_2} + Y_{NO}C_{vNO} + Y_{O_2}C_{vO_2} + Y_{Al_2O_3}C_{vAl_2O_3}} \quad (17a)$$

The values of $C_p$ for the various components at the temperature involved in each example are obtained from the second column of the JANAF Thermochemical Tables, D.R. Stull and H. Prophet, NSRD-NBS37, June, 1971, Superintendent of Documents, U.S. Government Printing Office, incorporated herein by reference. For the gas components $C_v$ is approximately equal to $(C_p\text{-R})$, where $R = 1.987165$ calories/deg./mole, while for solids, $C_v$ is approximately equal to $C_p$.

For example E, where $T = 1164°$ K,

| | |
|---|---|
| $C_{pCO_2} = 13.386$ | $C_{vCO_2} = 11.399$ |
| $C_{pN_2} = 8.019$ | $C_{vN_2} = 6.025$ |
| $C_{pNO} = 8.301$ | $C_{vNO} = 6.314$ |
| $C_{pO_2} = 8.495$ | $C_{vO_2} = 6.508$ |
| $C_{pAl_2O_3} = 30.36$ | $C_{vAl_2O_3} = 30.36$ |

Substituting in equation (17a), and neglecting the small NO terms, gives $$\gamma = \frac{(.1761 \times 13.39) + .3521 \times 8.02 + (.3588 \times 8.5) + (.1129 \times 30.4)}{(.1761 \times 11.4) + (.3521 \times 6.025) + (.3588 \times 6.51) + (.1129 \times 30.4)}$$

$$= \frac{11.664}{9.897} = 1.179$$

The quantity M in equation (16) is calculated as follows:

$$M = Y_{CO_2}m_{CO_2} + Y_{N_2}m_{N_2} + Y_{O_2}m_{O_2} + Y_{Al_2O_3}m_{Al_2O_3} = (0.1761 \times 44.01) \times (0.3521 \times 28.014) + (0.3588 \times 32) + (0.1129 \times 101.96) = 40.606 \text{ grams.} \quad (18)$$

The speed of sound in the gas in Example E is $$C = \sqrt{\frac{1.179 \times 8.3143 \times 10^7 \times 1164}{40.696}} = 5.301 \times 10^4 \text{ cm/sec.,}$$

and $$\tau_E = \frac{.06}{5.301 \times 10^4} = 1.1319 \times 10^{-6} \text{ second.}$$

The above $\gamma$ calculations for Example E did not require any consideration of the effects of CO, $H_2$ or $H_2O$, because $n_{CO}$, $N_{H_2}$ and $n_{H_2O}$ were all zero. However, in an example, such as Example K in which the equilibrium products include appreciable CO, it is necessary to: (1) include $X_{CO}$, $Y_{CO}$, $K_{1, CO}$, $K_{2, CO}$ and $K_{13, CO}$ in equations (12b), (12c) and (12d) for $\tau_a$, $\tau_b$ and $\tau_c$; (2) re-write equation (14) as follows:

$$\tau_{II} = \left[\frac{X_{CO_2}}{a} + \frac{X_{N_2}}{b} + \frac{X_{CO}}{d}\right] \frac{1}{X_{CO_2} + X_{N_2} + X_{CO}}; \quad (14a)$$

(3) include $Y_{CO}$, $C_{pCO_2}$ and $C_{vCO}$ in equation (17a); and (4) include $Y_{CO}$ and $m_{CO}$ in equation (18). The values of $K_{1, CO}$ and $K_{13, CO}$ are assumed to be substantially equal to the values of $K_{1, N_2}$ and $K_{13, N_2}$, respectively. $K_{2, CO}$ is substantially equal to $K_{2, N_2}$, according to line 12, column 1, page 3233 of "Shock Tube Vibrational Relaxation Measurements: $N_2$ Relaxation by $H_2O$ and the CO-$N_2$ V-V Rate", by C. W. von Rosenberg, Jr., K. N. C. Bray and N. H. Pratt, The Journal of Chemical Physics, Volume 56, Number 1, April, 1972, pages 3230-37. The term $\tau_d$, in equation (14a), is the relaxaton time for an additional reaction similar to reaction (2) of Taylor and Bitterman (page 27), which may be written as follows:

$$CO^* + M \rightleftarrows CO + M + 2143 \text{ cm}^{-1},$$

where M includes $CO_2$, $N_2$ and CO. An equation, similar to equation (12b), for determining $\tau_d$ is $$1/\tau_d = X_{CO_2}DK_{d, CO_2} + X_{N_2}DK_{d, N_2} + X_{CO}DK_{d, CO} \quad (12e)$$

It is assumed that

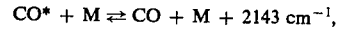

$$K_{d, CO_2} = K_{d, CO}.$$

From line 12, col. 1, page 3233 of Rosenberg, Bray and Pratt, $$K_{d, CO} = K_{d, N_2}.$$

Figure 7:
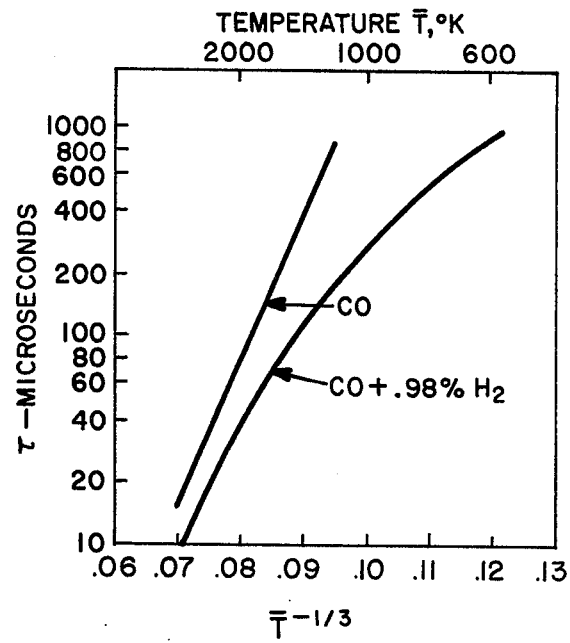

The rate constant $K_{d, CO}$ for reaction (d) may be determined from $$K_{d, CO} = 1/D_o \tau_{CO\text{-}CO},$$

where $D_o$ is the number density at one atmosphere and 273° K, and $\tau_{CO\text{-}CO}$ is the relaxation time of pure CO plotted against the temperature T in FIG. 7, which is a substantial duplicate of FIG. 2 of "Shock-Tube Study of Vibrational Relaxation in Carbon Monoxide for the Fundamental and First Overtone", W. J. Hooker and R. C. Millikan, Volume 18, Number 1, The Journal of Chemical Physics, January, 1963, pp. 214-20.

Figure 8:
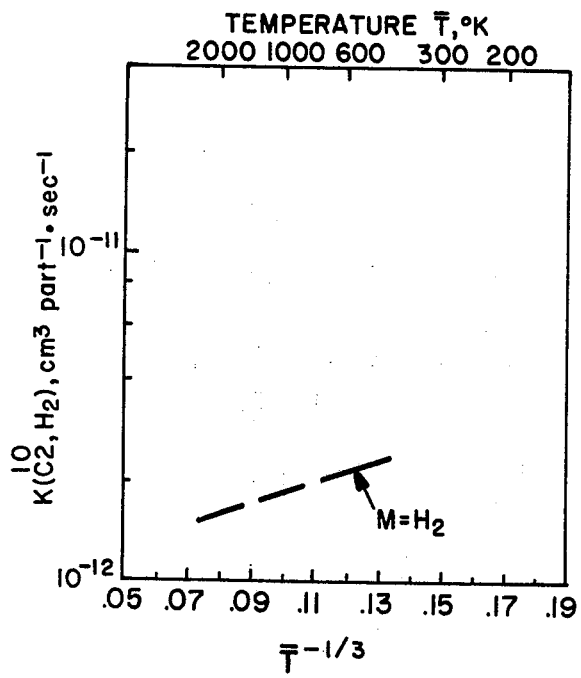
Figure 9:
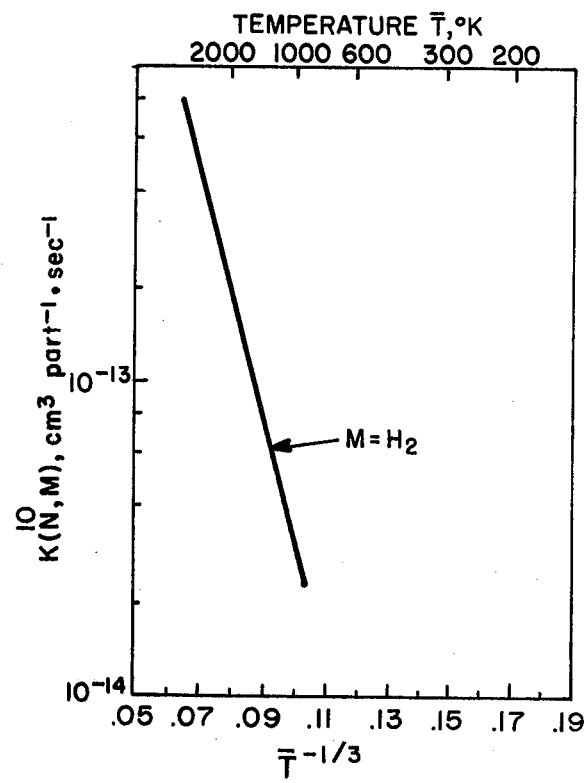
Figure 10:
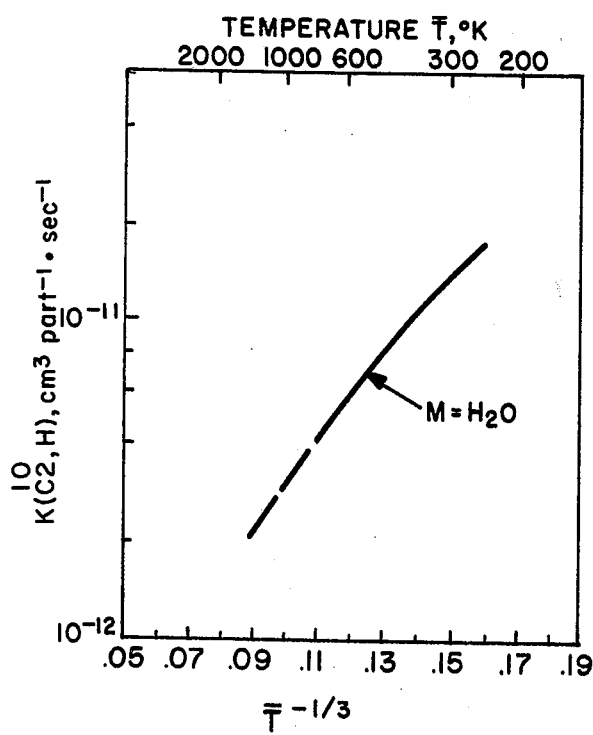
Figure 11:
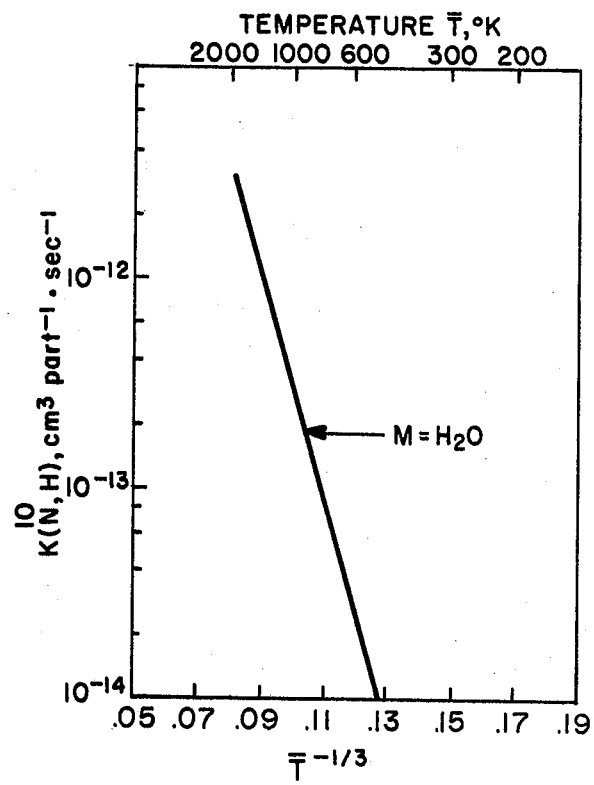

In an example, such as A and B, wherein the explosive mixture includes hydrogen H as well as CO, it is necessary to include X, Y, $K_1$, $K_2$, $K_{13}$, $K_d$, $C_p$ and $C_v$ terms for both $H_2$ and $H_2O$, if both are present in the equilibrium products, in equations (12b), (12c), (12d), (12e), (17a) and (18). No change is made in equation (14) for $\tau_{II}$, because neither $H_2$ nor $H_2O$ has a lasing effect like those of $CO_2$, $N_2$ and CO. The values of $K_{1, H_2}$ and $K_{2, H_2}$ are obtained from FIGS. 8 and 9, respectively, which are substantial duplicates of FIGS. 5 and 8 of Taylor and Bitterman, respectively. $K_{13, H_2}$ and $K_{13, H_2O}$ are obtained from FIG. 4 (see lines 50-53, column 2, page 42 of Taylor and Bitterman relative to $H_2$. $K_{1, H_2O}$ and $K_{2, H_2O}$ are obtained from FIGS. 10 and 11, which are substantial duplicates of FIGS. 3 and 7, respectively, of Taylor and Bitterman. $K_{d, H_2}$ is obtained from the curve in FIG. 7 labeled "CO + 0.98 H$_2$". According to the Abstract of "The Effect of Water Vapor on the Vibrational Relaxation of CO", by C. W. von Rosenberg, Jr., K. N. C. Bray and N. H. Pratt; presented at the 13th International Symposium on Combustion, University of Utah, Aug. 23–29, 1970; published by The Combustion Institute, Pittsburgh, Pennsylvania, 1971.

$$P \tau (CO - H_2O) = 0.17 \text{ atmospheres } \mu \text{ sec}, \quad (20)$$

between 1230° and 2600° K with virtually no temperature dependence. It is assumed that P $\tau$ will also be substantially independent of temperature down to 1100° K. Therefore, at one atmosphere, $$\tau CO - H_2O = 0.17 \ \mu\text{sec.}, \quad (21)$$

and $$K_{d, H_2O} = 1/D_o \tau_{CO - H_2O}. \quad (22)$$

The foregoing disclosure and the appended drawings are merely illustrative of the principles of this invention and are not to be interpreted in a limiting sense. We wish it to be understood that we do not desire to be limited to the exact details of construction shown and described, because obvious modifications will occur to a person skilled in the art.

We claim:

1. A method of forming a CO$_2$ lasting medium having a population inversion therein, comprising the steps of:
   detonating a condensed explosive mixture consisting of at least one nonhydrogenous organic explosive compound containing carbon, nitrogen and oxygen and aluminum powder in a confining chamber, to produce explosion products constituting a predominantly gaseous medium therein including CO$_2$ and N$_2$ gases; and
   directing the explosion products produced by said detonation through a nozzle and an expansion region in said chamber;
   the percentage of said aluminum powder in said explosive mixture ranging from 7.5% to 17.5% and being effective to produce a pressure in said nozzle of not more than 10 atmospheres at a temperature of at least 1100° K, and to make the relaxation time $\tau_{II}$ of the upper lasing level, the characteristic expansion time $\tau_E$ of said lasing medium and the relaxation time $\tau_I$ of the lower lasing level satisfy the condition $$\tau_{II} > \tau_E > \tau_I,$$

whereby a population inversion is produced in said expansion region.

2. The method of claim 1, wherein said nozzle is a convergent-divergent nozzle comprising at least one throat constituting the entrance to said expansion region.

3. The method of claim 1, wherein said explosive mixture consists of TNM and aluminum powder.

4. The method of claim 3, wherein the percentage of aluminum in said explosive mixture lies between 12.5 and 17.5%.

5. The method of claim 1, wherein said explosive mixture consists of TNM and HNB, and aluminum powder.

6. The method of claim 1, wherein:

said explosive mixture is selected from the group consisting of:
   85% TNM and 15% Al powder;
   46.25% TNM, 46.25% HNB and 7.5% Al powder;
   45% TNM, 45% HNB and 10% Al powder;
   40.5% TNM, 49.5% HNB and 10% Al powder;
   33.75% TNM, 53.75% HNB and 12.5% Al powder; and
   25.5% TNM, 59.5% HNB and 15% Al powder;
said pressure at said nozzle is 1.35 to 4.66 atmospheres; and
said temperature is 1130° to 1181° K.

7. The method of claim 6, wherein said explosive mixture consists of 85% TNM and 15% Al powder; said pressure is about 4 atmospheres; and said temperature is about 1164° K.

8. The method of claim 6, wherein said explosive mixture consists of 45% TNM, 45% HNB and 10% Al powder; said pressure is about 1 atmosphere; and said temperature is about 1140° K.

9. The method of claim 6, wherein said explosive mixture consists of 33.75% TNM, 53.75% HNB and 12.5% Al powder; and said pressure is about 5 atmospheres; and said temperature is about 1130° K.

10. The method of claim 1, wherein said explosive mixture consists of 82.5% TNM and 17.5% Al powder; said pressure in said nozzle is about 2 atmospheres; and said temperature is about 1357° K.

11. An apparatus for producing a CO$_2$ lasing medium having a population inversion therein, comprising:
    means defining a confining chamber;
    a condensed explosive mixture disposed in said chamber consisting of a least one nonhydrogenous organic explosive compound containing carbon, nitrogen and oxygen and aluminum powder;
    means for detonating said explosive mixture to produce explosion products constituting a predominantly gaseous medium including CO$_2$ and N$_2$ gases in said chamber; and
    a nozzle and an expansion region in said chamber through which said products pass;
    the percentage of said aluminum powder in said explosive mixture ranging from 7.5% to 17.5% and being effective to produce a pressure in said nozzle of not more than 10 atmospheres at a temperature of at least 1100° K., and to make the relaxation time $\tau_{II}$ of the upper lasing level, the characteristic expansion time $\tau_E$ of said lasing medium and the relaxation time $\tau_I$ of the lower lasing level satisfy the condition $$\tau_{II} > \tau_E > \tau_I,$$

whereby a population inversion is produced in said expansion region.

12. An apparatus as in claim 11, wherein said nozzle is a convergent-divergent nozzle comprising at least one throat constituting the entrance to said expansion.

13. An apparatus as in claim 11, wherein said chamber defining means comprises a double-walled metal structure made up of two concentric elongated metal members, with the space between said members partially filled with a resilient cushioning material, and said explosive mixture is in the form of a solid element disposed coaxially within the inner member, near one end thereof.

14. The apparatus of claim 13, wherein an optical window for transmitting laser radiation is disposed in said structure laterally opposite said expansion region.

* * * * *